US012184566B2

(12) United States Patent
Rossbach et al.

(10) Patent No.: US 12,184,566 B2
(45) Date of Patent: Dec. 31, 2024

(54) UPLINK SKIPPING WITH MULTIPLE CONFIGURED GRANTS WITHOUT LCH-BASED PRIORITIZATION

(71) Applicant: APPLE INC., Cupertino, CA (US)

(72) Inventors: Ralf Rossbach, Neubiberg (DE); Fangli Xu, Beijing (CN); Weidong Yang, Cupertino, CA (US); Haijing Hu, Cupertino, CA (US); Wenshu Zhang, Cupertino, CA (US); Sigen Ye, Cupertino, CA (US); Sarma V. Vangala, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 503 days.

(21) Appl. No.: 17/593,176

(22) PCT Filed: Jan. 14, 2021

(86) PCT No.: PCT/CN2021/071892
§ 371 (c)(1),
(2) Date: Sep. 10, 2021

(87) PCT Pub. No.: WO2022/151240
PCT Pub. Date: Jul. 21, 2022

(65) Prior Publication Data
US 2023/0179350 A1   Jun. 8, 2023

(51) Int. Cl.
*H04L 5/00* (2006.01)
*H04W 72/21* (2023.01)
(52) U.S. Cl.
CPC .......... *H04L 5/0044* (2013.01); *H04W 72/21* (2023.01)

(58) Field of Classification Search
CPC ... H04L 5/0044; H04L 5/0007; H04L 5/0053; H04W 72/21
See application file for complete search history.

(56) References Cited

U.S. PATENT DOCUMENTS

| 2014/0286299 | A1  | 9/2014  | Ihm et al. | |
|---|---|---|---|---|
| 2019/0245737 | A1* | 8/2019  | Zhou | H04B 7/06 |
| 2021/0007129 | A1  | 1/2021  | Talarico et al. | |
| 2021/0320760 | A1* | 10/2021 | Rastegardoost | H04L 1/0028 |
| 2022/0232591 | A1* | 7/2022  | Hosseini | H04W 72/569 |

(Continued)

FOREIGN PATENT DOCUMENTS

CN          111278129 A      6/2020

OTHER PUBLICATIONS

R2-2109156, Aug. 2021, 3GPP.*

(Continued)

*Primary Examiner* — Jae Y Lee
(74) *Attorney, Agent, or Firm* — Dorsey & Whitney LLP

(57) ABSTRACT

A method for a user equipment (UE) includes decoding an information element (IE) MAC-CellGroupConfig, determining that a field lch-BasedPrioritization of the IE MAC-CellGroupConfig is not configured, determining that a plurality of configured grants (CGs) overlap in time domain, each of the plurality of CGs indicative of uplink resources for allocation to a corresponding one of a plurality of CG physical uplink share channels (CG-PUSCH), causing uplink control information (UCI) to be multiplexed onto a CG-PUSCH, and selecting the CG-PUSCH with multiplexed UCI for transmission.

11 Claims, 9 Drawing Sheets

(56) References Cited

U.S. PATENT DOCUMENTS

2023/0164702 A1* 5/2023 Lee .................... H04W 52/32
   455/522
2023/0379092 A1* 11/2023 Chin ................. H04W 72/232

OTHER PUBLICATIONS

3GPP TS 38.331 v16.5.0 (Jun. 2021).*
3GPP TS 38.213 v16.6.0 (Jun. 2021).*
Huawei, HiSilicon, "Discussions on the remaining issues on PUSCH with UL skipping", R2-2010317, 3GPP TSG-RAN WG2 Meeting #112, Online, Agenda Item 6.16, Nov. 2-13, 2020, 17 pages.
PCT/CN2021/071892, International Search Report and Written Opinion, Sep. 28, 2021, 9 pages.

* cited by examiner

UPLINK SKIPPING WITH MULTIPLE CONFIGURED GRANTS WITHOUT LCH-BASED PRIORITIZATION

TECHNICAL FIELD

This application relates generally to wireless communication systems, and more specifically to a method and apparatus for uplink (UL) skipping with multiple configured grants (CGs) overlapping.

BACKGROUND

Wireless mobile communication technology various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups a worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

When multiple configured grants (CGs) overlap in Release 16, the UE selects one of them and creates only one MAC PDU. The selection process is up to UE implementation. According to RAN1's LS in R1-2009772, the UE is expected to create a medium access control (MAC) protocol data unit (PDU) for the configured grant physical uplink share channel (CG-PUSCH) with uplink control information (UCI). However, if the UCI is to be multiplexed onto a PUSCH, there is a possibility that the UE implementation may not select the PUSCH with UCI for transmission.

SUMMARY

According to an aspect of the present disclosure, a method for a user equipment (UE) is provided that comprises decoding an information element (IE) MAC-CellGroupConfig; determining that a field lch-BasedPrioritization of the IE MAC-CellGroupConfig is not configured; determining that a plurality of configured grants (CGs) overlap in time domain, each of the plurality of CGs indicative of uplink resources for allocation to a corresponding one of a plurality of CG physical uplink share channels (CG-PUSCHs) causing uplink control information (UCI) to be multiplexed onto a CG-PUSCH; and selecting the CG-PUSCH with multiplexed UCI for transmission.

According to an aspect of the present disclosure, a method for a user equipment (UE) is provided that comprises decoding an information element (IE) MAC-CellGroupConfig; determining that a field lch-BasedPrioritization of the IE MAC-CellGroupConfig is not configured; determining that a plurality of configured grants (CGs) overlap in time domain; and causing uplink control information (UCI) to be multiplexed onto a physical uplink control channel (PUCCH) and not onto a physical uplink share channel (PUSCH).

According to an aspect of the present disclosure, an apparatus for a user equipment (UE) is provided. The apparatus comprises one or more processors configured to perform steps of any of the methods described above.

According to an aspect of the present disclosure, a computer readable medium is provided having computer programs stored thereon which, when executed by one or more processors, cause an apparatus to perform steps of any of the methods described above.

According to an aspect of the present disclosure, an apparatus for a communication device is provided, comprising means for performing steps of any of the methods described above According to an aspect of the present disclosure, a computer program product is provided comprising computer programs which, when executed by one or more processors, cause an apparatus to perform steps of any of the methods described above.

BRIEF DESCRIPTION OF THE DRAWINGS

Features and advantages to the disclosure will be apparent from the detailed description which follows, taken in conjunction with the accompanying drawings, which together illustrate, by way of example, features of the disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

According to Release 16, if a field lch-BasedPrioritization in the information element MAC-CellGroupConfig is not configured, the general expectation is that UL skipping should work. Meanwhile, when multiple configured grants (CGs) overlap in Rel. 16, the UE selects one of them and creates only one MAC PDU. The selection process is up to UE implementation. This is reflected in TS 38.321, NOTE 7: If the MAC entity is not configured with lch-BasedPrioritization and if there is overlapping PUSCH duration of at least two configured uplink grants, it is up to UE implementation to choose one of the configured uplink grants.

According to RAN1's LS in R1-2009772, the UE is expected to create a MAC PDU for the CG-PUSCH with UCI. However, if UCI is to be multiplexed onto a PUSCH, one may argue that UE implementation (in MAC) may not select the PUSCH with UCI for transmission.

In view of this, the present disclosure provides some mechanisms to alleviate, mitigate or eliminate the concerns mentioned above. Embodiments of the present disclosure are described below with reference to the accompanying drawings.

Figure 1:
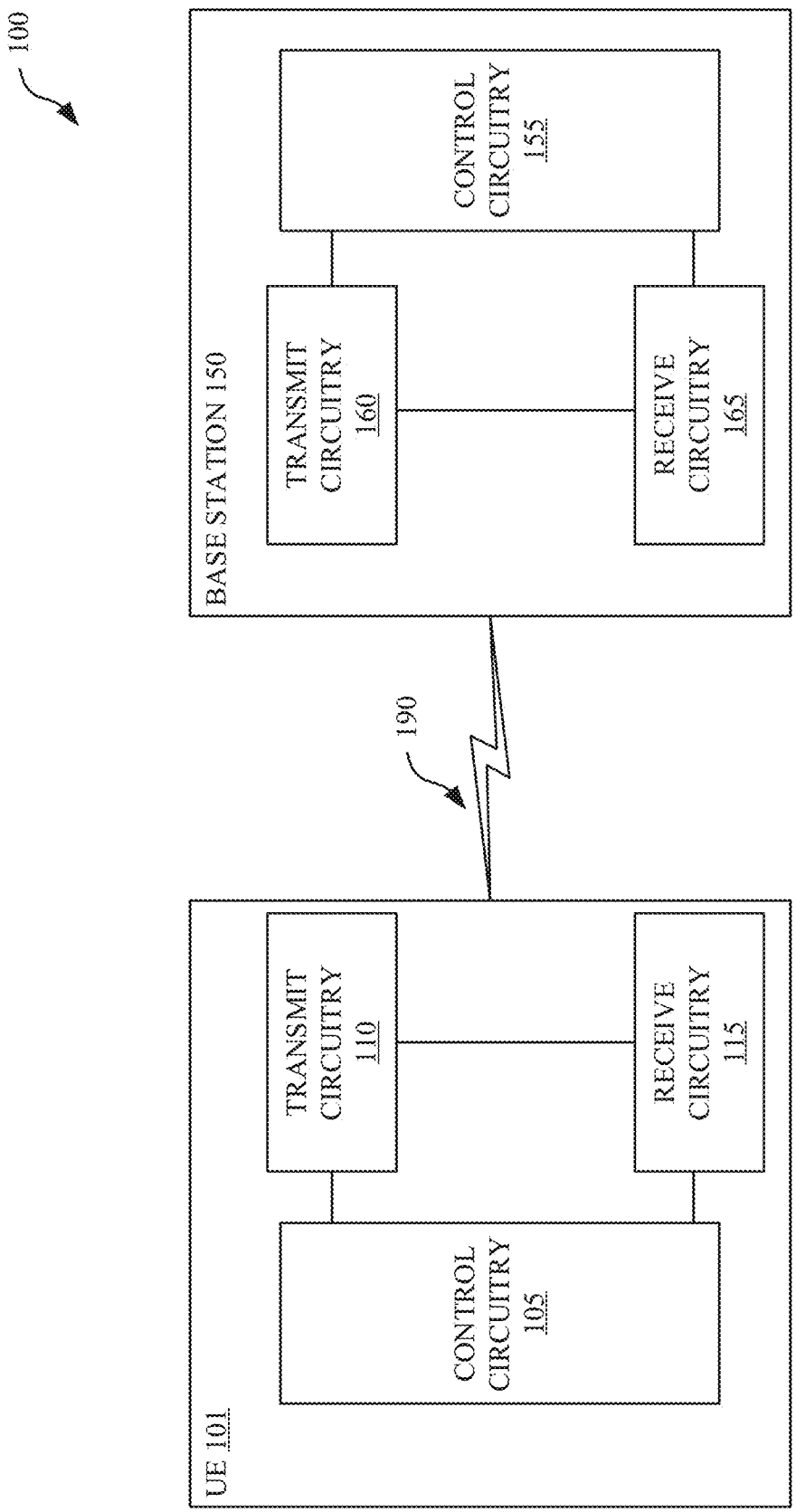
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 1 10 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculation may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 1 10 and the receive circuitry 1 15 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the marrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink sub-frames.

Within the narrows system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-flame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interface from other sources, reflections, or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 1 15 may receive multiple copies of the same data multiple times.

Figure 2:
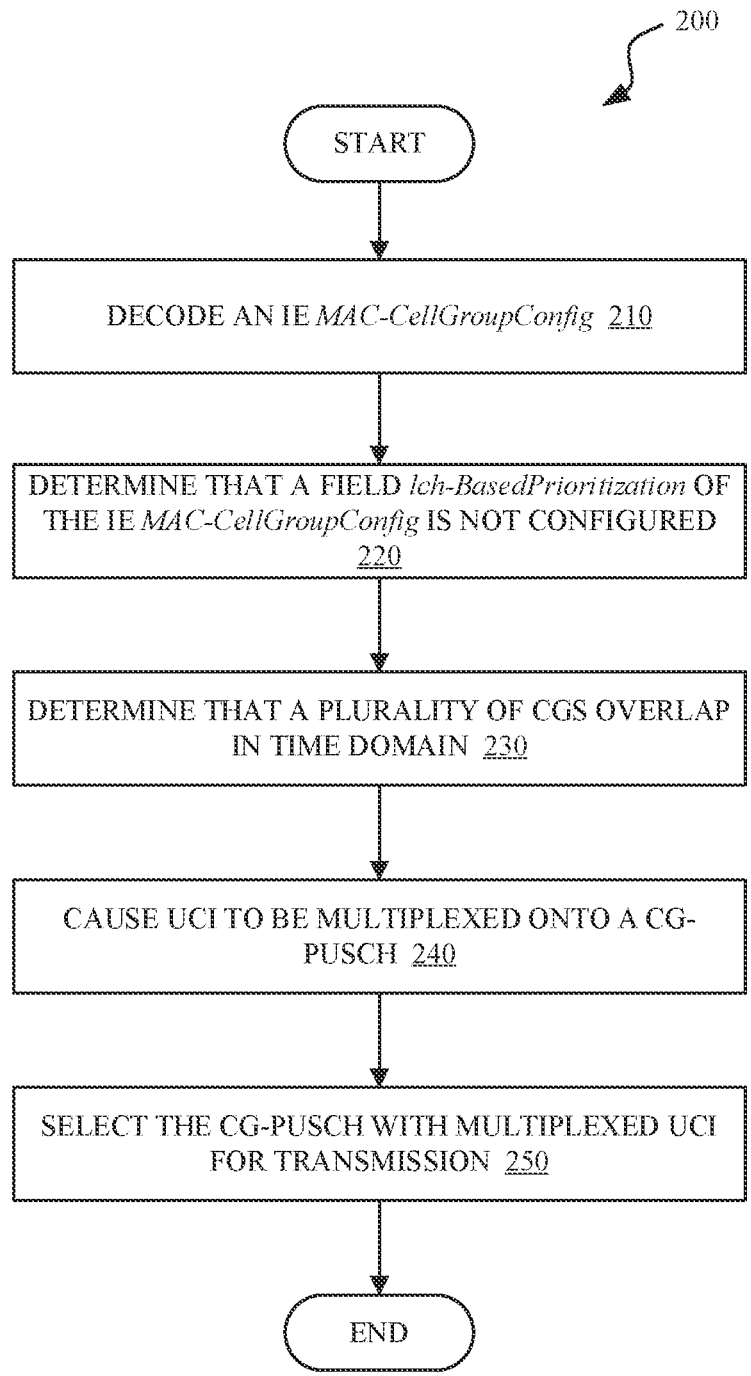
FIG. 2 is a flow chart of a method in accordance with some embodiments.

FIG. 2 illustrates a flow chart of a method 200 in accordance with some embodiments. The method 200, which includes steps 210 to 240, may, for example, be performed at a UE, e.g., the UE 101 in FIG. 1.

At step 210, the method 200 includes decoding an information element (IE) MAC-CellGroupConfig. The IE MAC-CellGroupConfig is used to configure MAC parameters for a cell group, including discontinuous reception (DRX). An example struct of the IE MAC-CellGroupConfig is show as follows.

```
- ASN1START
- TAG-MAC-CELLGROUPCONFIG-START
MAC-CellGroupConfig ::= SEQUENCE {
drx-Config SetupRelease { DRX-Config } OPTIONAL, - Need M
schedulingRequestConfig SchedulingRequestConfig OPTIONAL, - Need M
bsr-Config BSR-Config OPTIONAL, - Need M
tag-Config bar OPTIONAL, - Need M
phr-Config SetupRelease { PHR-Config } OPTIONAL, - Need M
skipUplinkTxDynamic BOOLEAN,
...,
[[
csi-Mask BOOLEAN OPTIONAL, - Need M
dataInactivityTimer SetupRelease
{ DataInactivityTimer } OPTIONAL - Cond MCG-Only
]],
[[
usePreBSR-r16 ENUMERATED {true} OPTIONAL, - Need R
schedulingRequestID-LBT-SCell-r16 SchedulingRequestId OPTIONAL, - Need R
lch-BasedPrioritization-r16 ENUMERATED {enabled} OPTIONAL, - Need R
schedulingRequestID-BFR-SCell-r16 SchedulingRequestId OPTIONAL, - Need R
dx-ConfigSecondaryGroup-r16 SetupRelease
{ DRX-ConfigSecondaryGroup } OPTIONAL - Need M
]]
}
DataInactivityTimer ::= ENUMERATED {s1, s2, s3, s5, s7, s10,
s15, s20, s40, s50, s60, s80, s100, s120, s150, s180}
- TAG-MAC-CELLGROUPCONFIG-STOP
- ASN1STOP
```

The IE MAC-CellGroupConfig is generally included in an RRCSetup message received from a network in a process of RRC setup, and/or in an RRCReconfiguration message received from a network in a process of RRC reconfiguration.

Figure 3A:
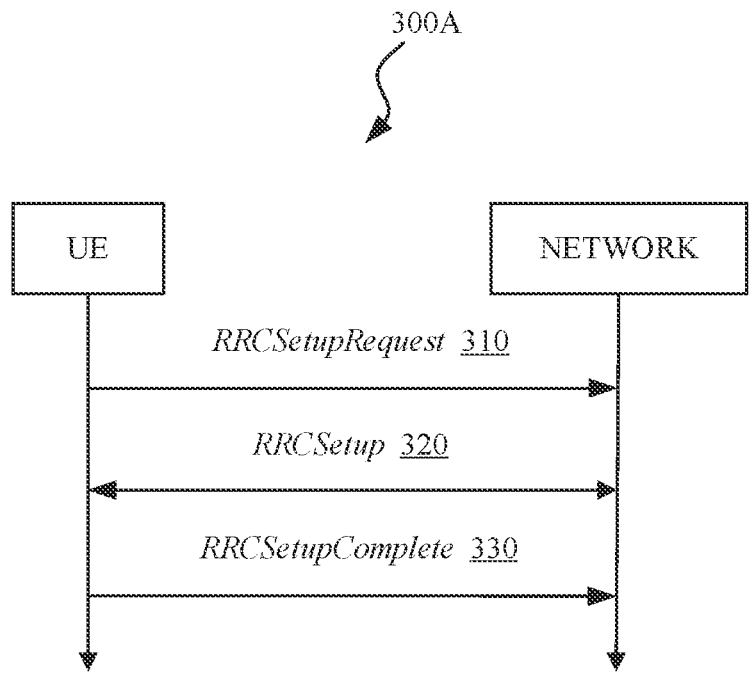
FIG. 3A is a flow chart illustrating an example process of radio resource control (RRC) setup.

FIG. 3A illustrates an example process 300A of RRC setup. Referring to FIG. 3A, at step 310, the UE uses time-frequency resources obtained in a random access response (RAR) to send an RRCSetupRequest message, which includes at least the UE identity and the establishment cause. The network (e.g., a gNB) uses a temporary cell-radio network temporary identifier (TC-RNTI) to scramble the physical downlink control channel (PDCCH) of downlink control information (DCI) 1_0 and sends it to the UE, and the UE descrambles to obtain an RRCSetup message at step 320. Then, the network starts preparing to establish the parameters of signaling radio bearer 1 (SRB1). The UE decodes the RRCSetup message to obtain radio bearer related configuration and master cell group information parameters. The RRCSetup message can include the IE MAC-CellGroupConfig as described above. Next, the network uses Cell-RNTI (C-RNTI) to scramble the PDCCH of DCI 0_0 and sends it to the UE. The UE correspondingly descrambles to obtain the time-frequency resources and modulation and coding scheme (MCS) information required to send an RRCSetupComplete message. At step 330, the UE uses the MCS configured by network to send the RRCSetupComplete message at the corresponding time-frequency resource location.

Figure 3B:
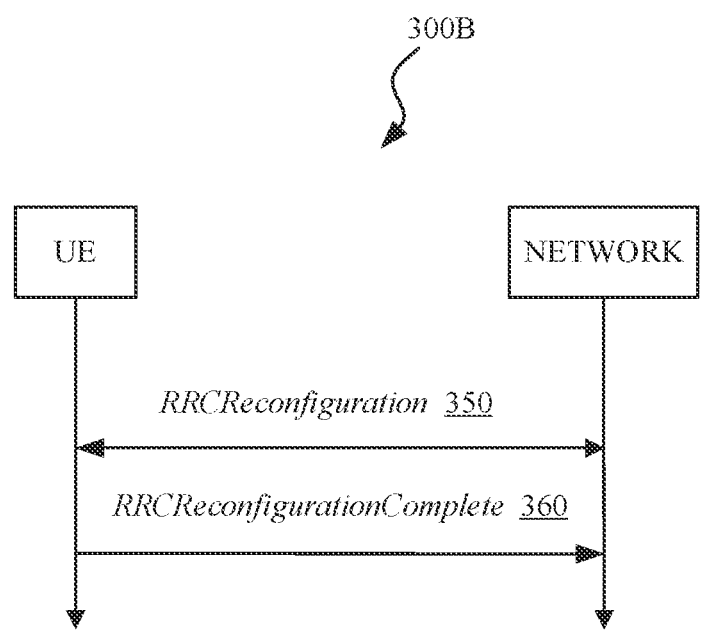
FIG. 3B it a flow chart illustrating an example process of RRC configuration.

FIG. 3B illustrates an example process 300B of RRC reconfiguration. Referring to FIG. 3B, at step 350, the network sends an RRCReconfiguration message to the UE. The purpose of the RRCReconfiguration message is to modify the network connection. The operations involved include, but not limited to:

Establishing, modifying and releasing resource block (RB) resources;
Creating, modifying and releasing measurements;
Adding, modifying and releasing secondary cell (SCell) and cellGroup;
Adding, modifying and releasing the switch configuration;
Adding modifying and releasing primary secondary cell (PSCell) to change configuration, and
Transmitting of non-access stratum (NAS) layer dedicated information from the network to the UE.

The network configures the UE with master cell group (MCG) and can configure 0 or 1 secondary cell group (SCG). The network provides a configuration parameter CellGroupConfig, which includes the IE MAC-CellGroupConfig as described above.

Now referring back to FIG. 2, at step 220, the method 200 includes determining that a field lch-BasedPrioritization of the IE MAC-CellGroupConfig is not configured. As shown in the example struct of the IE MAC-CellGroupConfig given above, this IE may include the field lch-BasedPrioritization, which is optionally present. If this field is present, a corresponding MAC entity of the UE is configured with prioritization between overlapping grants and between scheduling request and overlapping grants based on logical channel (LCH) priority, see TS 38.321 [3]. It is absent if lch-BasedPrioritization is not configured in the MAC entity.

At step 230, the method 200 includes determining that a plurality of CGs overlap in time domain. Each of the plurality of CGs is indicative of uplink resources for allocation to a corresponding one of a plurality of CG-PUSCHs. Stated another way, a CG represents the grant for the transport block (TB) that is then sent in the PUSCH. As mentioned earlier, for multiple overlapping configured grants (CGs). UE implementation selects one of the grants and creates only one MAC PDU. The selection process is up to UE implementation and is reflected in TS 38.321, NOTE 7:

If the MAC entity is not configured with lch-BasedPrioritization and if there is overlapping, PUSCH duration of at least two configured uplink grants, it is up to UE implementation to choose one of the configured uplink grants.

At step 240, the method 200 includes causing UCI to be multiplexed onto a CG-PUSCH. In one example, physical layer (PHY) conducts UCI multiplexing over PUSCH within the domain of respective PHY priority. For example, low priority (LP) UCI may be multiplexed into LP PUSCH and high priority (HP) UCI may be multiplexed into HP PUSCH.

At step 250, the method 200 includes selecting the CG-PUSCH with multiplexed UCI for transmission. The selection process is up to UE implementation as specified in TS 38.321, NOTE 7. According to an implementation, a corresponding MAC entity of the UE selects the CG-PUSCH with multiplexed UCI for transmission.

According to the method embodiment 200 as described above, it can be ensured that a PUSCH with multiplexed UCI is transmitted, even if lch-BasedPrioritization is not configured and multiple CGs overlap in time. This advantageously conforms with the current RAN1 design, according to which if a UL grant is for a PUSCH that contains UCI, that PUSCH cannot be stripped.

Figure 4:
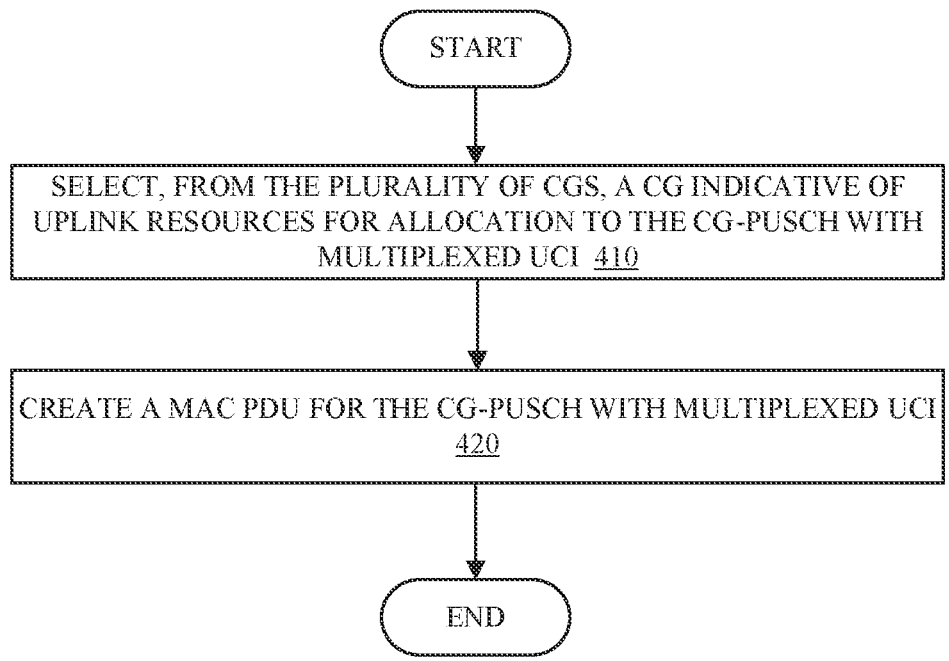
FIG. 4 is a flow chart illustrating an example process of a selecting step of the method of FIG. 2 in accordance with some embodiments.

In an embodiment, as shown in FIG. 4, step 250 may further include the following operations: At step 410, selecting, from the plurality of CGs, a CG indicative of uplink resources for allocation to the CG-PUSCH with multiplexed UCI. At step 420, creating a MAC PDU for the CG-PUSCH with multiplexed UCI. According to an implementation, MAC selects the CG for the PUSCH with multiplexed UCI and creates only one MAC PDU for the transmission of the CG-PUSCH with multiplexed UCI.

According to Release 16, when multiple CGs overlap, the UE selects one of them and creates only one MAC PDU. For purposes of standard compliance, the method 200 may, in an embodiment, further include: in accordance with a determination that the CG indicative of uplink resources for allocation to the CG-PUSCH with multiplexed UCI has been selected, not creating a MAC-PDU for a different CG-PUSCH than the one with multiplexed UCI. According to an implementation, once a CG-PUSCH has been selected by the UE, MAC is not going to create a MAC PDU for a different CG-PUSCH.

Figure 5:
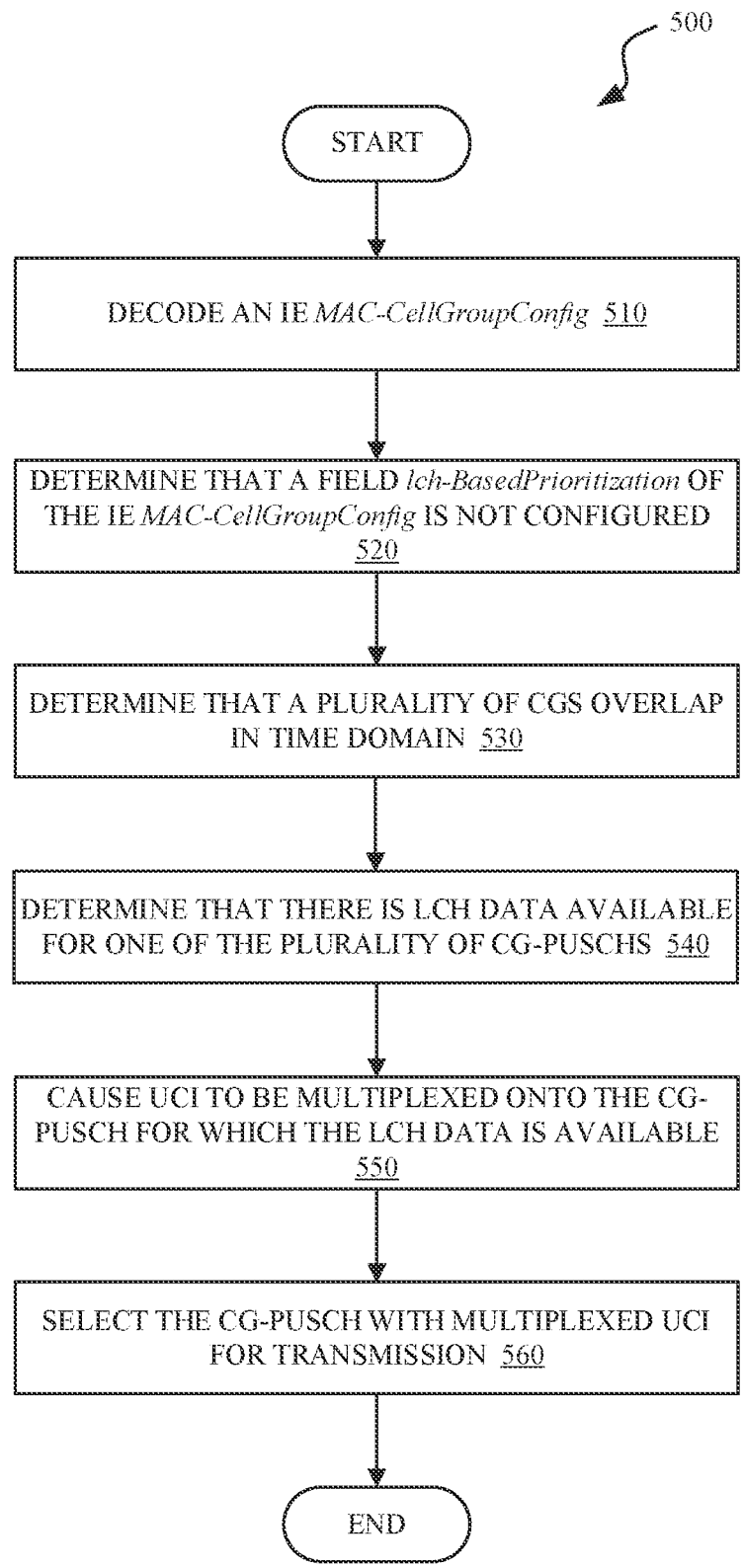
FIG. 5 is a flow chart of a method in accordance with some embodiments.

FIG. 5 illustrates a flow chart of method 500 in accordance with some embodiments. The method 500, which includes steps 510 to 560, may, for example, be performed at a UE, e.g., the UE 101 in FIG. 1.

Steps 510 to 530 are similar or same as steps 210 to 230 as described above with respect to FIG. 2, and are not described here in detail for conciseness.

At step 540, the method 500 includes determining that there is LCH data available for one of the plurality of CG-PUSCHs.

At step 550, the method 500 includes causing the UCI to be multiplexed onto the CG-PUSCH for which the LCH data is available. By multiplexing the UCI onto the CG-PUSCH with LCH data available, both the UCI and the LCH data can be transmitted, thereby improving the data communication efficiency.

At step 560, the method 500 includes selecting the CG-PUSCH with multiplexed UCI for transmission. Advantageously, this is standard-compliant in that according to the current RAN1 design, a UL grant for a PUSCH that contains UCI cannot be skipped. This step is similar or same as step 250 as described above with respect to FIG. 2, and is not described here in detail for conciseness.

In an embodiment, the UCI may be one or more of a hybrid automatic repeat request acknowledgement/non-acknowledgement (HARQ ACK/NACK), channel state information (CSI), a channel quality indicator (CQI), a precoding matrix indicator (PMI), and a rank indication (RI).

Figure 6:
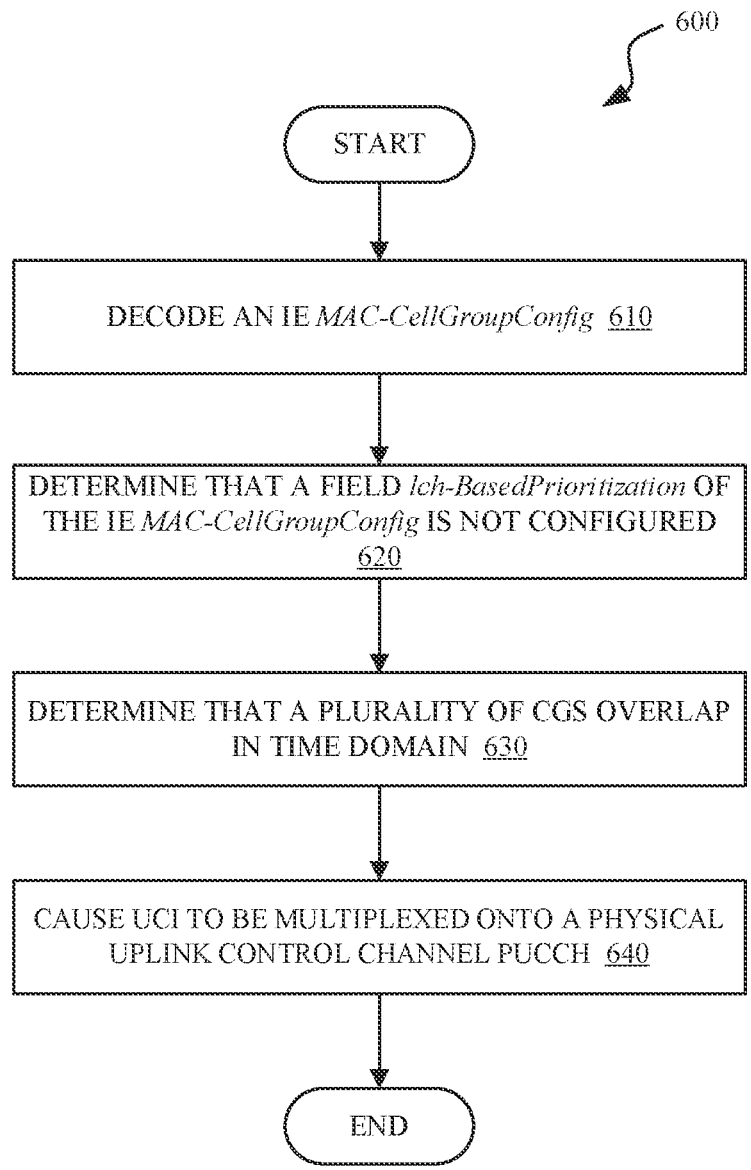
FIG. 6 is a flow chart of a method in accordance with some embodiments.

FIG. 6 illustrates a flow chart of a method 600 in accordance with some embodiments. The method 600, which includes steps 610 to 640, may, for example, be performed at a UE, e.g., the UE 101 in FIG. 1.

Steps 610 to 630 are similar or same as steps 210 to 230 as described above with respect to FIG. 2, and are not described here in detail for conciseness.

At step 640, the method 600 includes causing UCI to be multiplexed onto a physical uplink control channel (PUCCH) and not onto a physical uplink share channel (PUSCH). By multiplexing the UCI onto the PUCCH rather than the PUSCH, the issues with overlapping CGs may be addressed all at once.

If multiple CGs overlap, there is a possibility for more than one CG to have associated LCH data available. From a point view of the network, given the current specification the network cannot predict which CG the UE is going to select. If the UCI is to be multiplexed on one of the CGs, the network implementation will have to handle that case. Otherwise, if a network depends on predicting which CG is going to carry the UCI, the network implementation can avoid that case, for example, by adjusting downlink (DL) data timing (such that HARQ-ACK occurs at a different time), or by avoiding multiple overlapping CGs at all.

In an embodiment, the UCI may be one or more of a scheduling request (SR), a hybrid automatic repeal request acknowledgement/non-acknowledgement (HARQ ACK/NACK), channel state information (CSI), a channel quality indicator (CQI), a precoding matrix indicator (PMI), and a rank indication (RI).

In various embodiments, the methods 200, 500 and 600 may further include causing the selected CG-PUSCH with multiplexed UCI to be transmitted. According to an implementation, the only one MAC PDU created by MAC is delivered from MAC to PHY, and PHY proceeds to PUSCH transmission.

According to an aspect of the present disclosure, an apparatus for a user equipment (UE) is provided. The apparatus includes one or more processors configured to perform steps of any of the method embodiments described above.

According to an aspect of the present disclosure, a computer readable medium is provided having computer programs stored thereon which, when executed by one or more processors, cause an apparatus to perform steps of any or the method embodiments described above.

According to an aspect of the present disclosure, an apparatus for a communication device is provided, comprising means for performing steps of any of the method embodiments described above.

According to an aspect of the present disclosure, a computer program product is provided comprising computer programs which, when executed by one or more processors, cause an apparatus to perform steps of any of the method embodiments described above.

Figure 7:
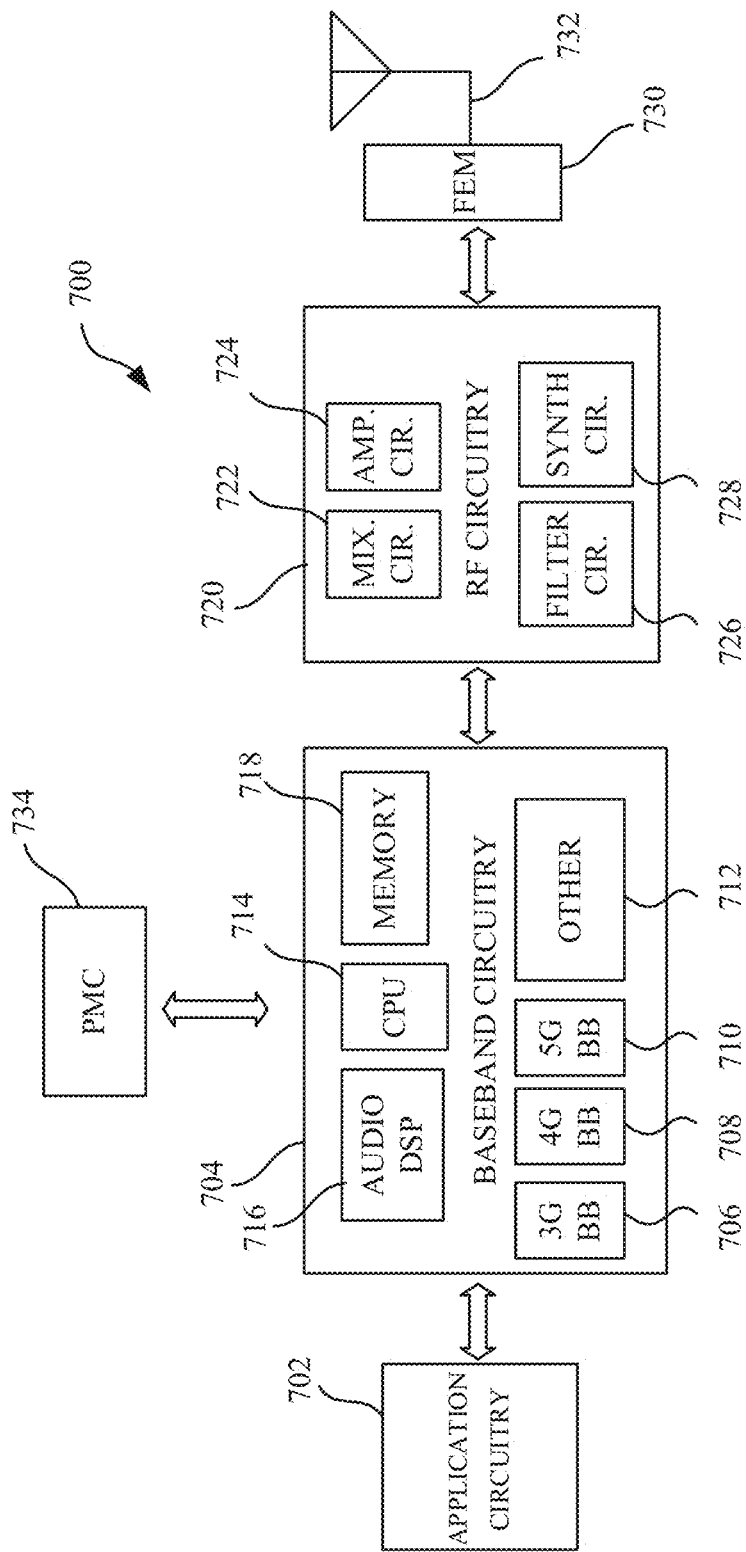
FIG. 7 illustrates a communication device (e.g., a UE or a base station) in accordance with some embodiments.

FIG. 7 illustrates example components of a device 700 in accordance with some embodiments. In some embodiment, the device 700 may include application circuitry 702, baseband circuitry 704, Radio frequency (RF) circuitry (shown as RF circuitry 720), front-end module (FEM) circuitry (shown as FEM circuitry 730), one or more antennas 732, and power management circuitry (PMC) (shown as PMC 734) coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination or general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 720 and to generate baseband signals for a transmit signal path of the RF circuitry 720. The baseband circuitry 704 may interface with the application circuitry 702 for generation and processing of the baseband signals and for controlling operations of the RF circuitry 720. For example, in some embodiments, the baseband circuitry 704 may include a third generation (3G) baseband processor (3G baseband processor 706), a fourth generation (4G) baseband processor (4G baseband processor 708), a fifth generation (5G) baseband processor (5G baseband processor 710), or other baseband processor(s) 712 for other existing generations, generations in development or to be developed in the future (e.g., second generation (2G), sixth generation (6G), etc.). The baseband circuitry 704 (e.g., one or more of baseband processors) may handle various radio control functions that enable communication with one or more radio networks via the RF circuitry 720. In other embodiments, some or all of the functionality of the illustrated baseband processors may be included in modules stared in the memory 718 and executed via a Central Processing ETnit (CPET 714). The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Cheek (LDPC) encoder/decoder functionality. Embodiments of modulation/demodulation and encoder/decoder functionality are not limited to these examples and may include other suitable functionality in other embodiments.

In some embodiments, the baseband circuitry 704 may include a digital signal processor (DSP), such as one or more audio DSP(s) 716. The one or more audio DSP(s) 716 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

The RF circuitry 720 may enable communication with wireless networks using modulated electromagnetic radiation through a non-solid medium. In various embodiments, the RF circuitry 720 may include switches, filters, amplifiers, etc. to facilitate the communication with the wireless network. The RF circuitry 720 may include a receive signal path which may include circuitry to down-convert RF signals received from the FEM circuitry 730 and provide baseband signals to the baseband circuitry 704. The RF circuitry 720 may also include a transmit signal path which may include circuitry to up-convert baseband signals provided by the baseband circuitry 704 and provide RF output signals to the FEM circuitry 730 for transmission. In some embodiments, the receive signal path of the RF circuitry 720 may include mixer circuitry 722, amplifier circuitry 724 and filter circuitry 726. In some embodiments, the transmit signal path of the RF circuitry 720 may include filter circuitry 726 and mixer circuitry 722. The RF circuitry 720 may also include synthesizer circuitry 728 for synthesizing a frequency for use by the mixer circuitry 722 or the receive signal path and the transmit signal path. In some embodiments, the mixer circuitry 722 of the receive signal path may be configured to down-convert RF signals received from the FEM circuitry 730 based on the synthesized frequency provided by synthesizer circuitry 728. The amplifier circuitry 724 may be configured to amplify the down-converted signals and the filter circuitry 726 may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 722 of the receive signal path may comprise passive mixers, although the scope of the embodiments is not limited in this respect.

In some embodiments, the mixer circuitry 722 of the transmit signal path may be configured to up-convert input baseband signals based on the synthesized frequency provided by the synthesizer circuitry 728 to generate RF output signals for the FEM circuitry 730. The baseband signals may be provided by the baseband circuitry 704 and may be filtered by the filter circuitry 726.

In some embodiments, the mixer circuitry 722 of the receive signal path and the mixer circuitry 722 of the transmit signal path may include two or more mixers and may be arranged for quadrature downconversion and upconversion, respectively. In some embodiments, the mixer circuitry 722 or the receive signal path and the mixer circuitry 722 of the transmit signal path may include two or more mixers and may be arranged for image rejection (e.g., Hartley image rejection). In some embodiments, the mixer circuitry 722 of the receive signal path and the mixer circuitry 722 may be arranged for direct downconversion and direct upconversion, respectively. In some embodiments, the mixer circuitry 722 of the receive signal path and the mixer circuitry 722 of the transmit signal paths may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 720 may include analog-to-digital converter (ADC) and digital-to-analog converter (DAC) circuitry and the baseband circuitry 704 may include a digital baseband interface to communicate with the RF circuitry 720

In some dual-mode embodiments, a separate radio IC circuitry may be provided for processing signals for each spectrum, although the scope of the embodiments is not limited in this respect.

In some embodiments, the synthesizer circuitry 728 may be a fractional −N synthesizer or a fractional N/N+1 synthesizer, although the scope of the embodiments is not limited in this respect as other types of frequency synthesizers may be suitable. For example, synthesizer circuitry 728 may be a delta-sigma synthesizer, a frequency multiplier, or a synthesizer comprising a phase-locked loop with a frequency divider.

The synthesizer circuitry 728 may be configured to synthesize an output frequency for use by the mixer circuitry 722 of the RF circuitry 720 based on a frequency input and a divider control input. In some embodiments, the synthesizer circuitry 728 may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesize circuitry 728 of the RF circuitry 720 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a factional division ratio. In some example embodiments, the DLL may include a set or cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 728 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 720 may include an IQ/polar converter.

The FEM circuitry 730 may include a receive signal path which may include circuitry configured to operate on RF signals received from one or more antennas 732, amplify the received signals and provide the amplified versions of the received signals to the RF circuitry 720 for further processing. The FEM circuitry 730 may also include a transmit signal path which may include circuitry configured to amplify signals for transmission provided by the RF circuitry 720 for transmission by one or more of the one or more antennas 732. In various embodiments, the amplification through the transmit or receive signal paths may be done solely in the RF circuitry 720, solely in the FEM circuitry 730, or in both the RF circuitry 720 and the FEM circuitry 730.

In some embodiments, the FEM circuitry 730 may include a TX/RX switch to switch between transmit mode and receive mode operation. The FEM circuitry 730 may include a receive signal path and a transmit signal path. The receive signal path of the FEM circuitry 730 may include an LNA to amplify received RF signals and provide the amplified received RF signals as an output (e.g., to the RF circuitry 720). The transmit signal path of the FEM circuitry 730 may include a power amplifier (PA) to amplify input RF signals (e.g., provided by the RF circuitry 720), and one or more filters to generate RF signals for subsequent transmission (e.g., by one or more of the one or more antennas 732).

In some embodiments, the PMC 734 may manage power provided to the baseband circuitry 704. In particular, the PMC 734 may control power-source selection, voltage sealing, battery charging, or DC-to-DC conversion. The PMC 734 may often be included when the device 700 is capable of being powered by a battery, for example, when the device 700 is included in an EGE. The PMC 734 may increase the power conversion efficiency while providing desirable implementation size and heat dissipation characteristics.

FIG. 7 shows the PMC 734 coupled only with the baseband circuitry 704. However, in other embodiments, the PMC 734 may be additionally or alternatively coupled with, and perform similar power management operations for, other components such as, but not limited to, the application circuitry 702, the RF circuitry 720, or the FEM circuitry 730.

In some embodiments, the PMC 734 may control, or otherwise be part of, various power saving mechanisms of the device 700. For example, if the device 700 is in an RRC Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC Idle state, where it disconnects from the network and does not perform operations such as channel quality feedback, handover, etc. The device 700 goes into a very low power state and it performs paging where again it periodically wakes up to listen to the network and then power down again. The device 700 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent doing this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmissions communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
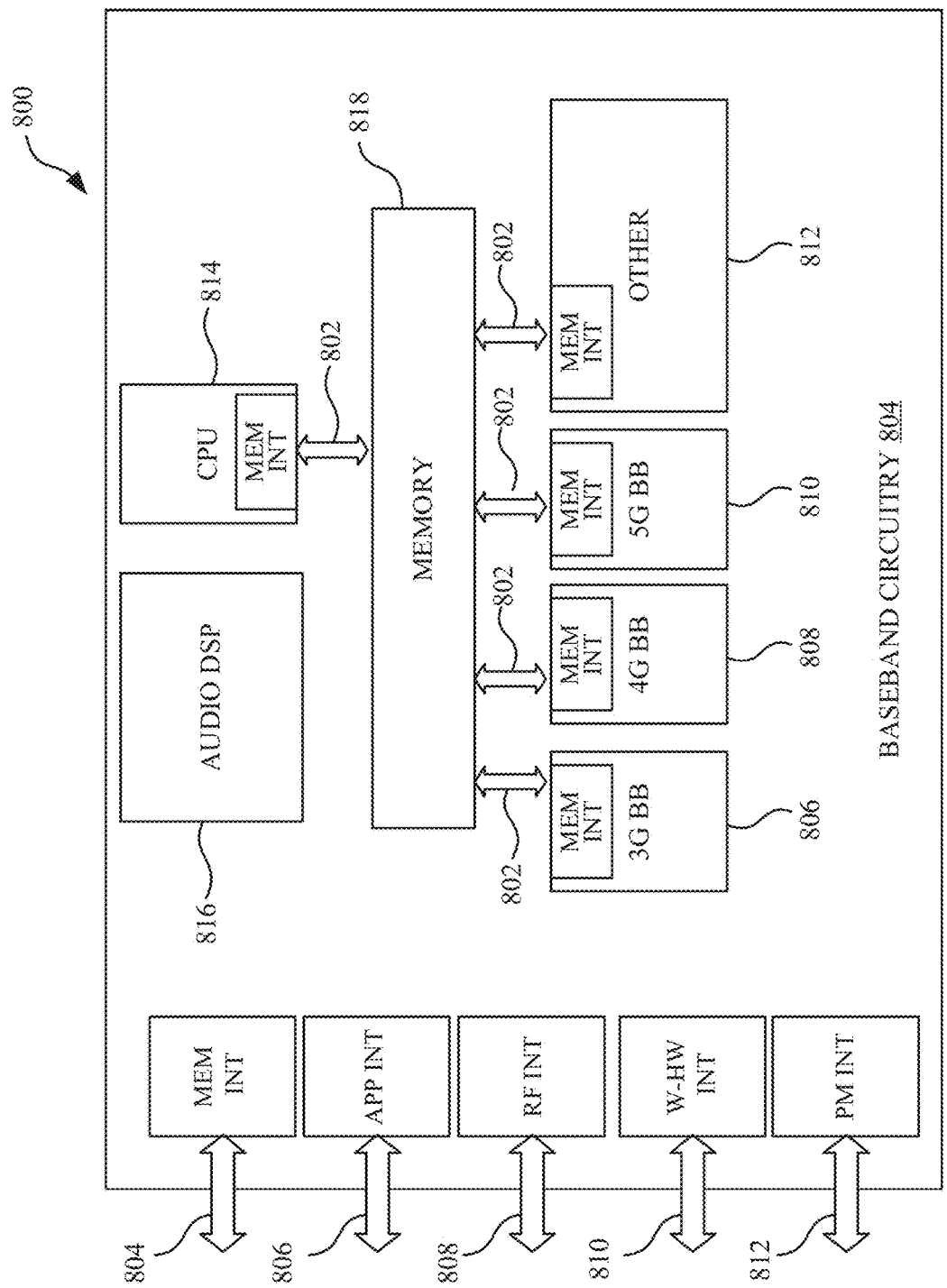
FIG. 8 illustrates example interfaces of baseband circuitry in accordance with some embodiments.

FIG. 8 illustrates example interfaces 800 of baseband circuitry in accordance with some embodiments. As discussed above, the baseband circuitry 704 of FIG. 7 may comprise 3G baseband processor 800, 4G baseband processor 808, 5G baseband processor 810, other baseband processor(s) 812, CPU 814, and a memory 818 utilized by said processors. As illustrated, each of the processors may include a respective memory interface 802 to send/receive a data to/from the memory 818.

The baseband circuitry 704 may further include one or more interfaces to communicatively couple to other circuitries/devices, such as a memory interface 804 (e.g., an interface to send/receive data to/from memory external to the baseband circuitry 704), an application circuitry interface 806 (e.g., an interface to send/receive data to/from the application circuitry 702 of FIG. 7), an RF circuitry interface 808 (e.g., an interface to send/receive data to/from RF Circuitry 720 of FIG. 7), a wireless hardware connectivity interface 810 (e.g., an interface to send/receive data to/from Near Field Communication (NFC) components, Bluetooth® components (e.g., Bluetooth® Low Energy), Wi-Fi® components, and other communication components), and a power management interface 812 (e.g., an interface to send/receive power or control signals to/from the PMC 734).

Figure 9:
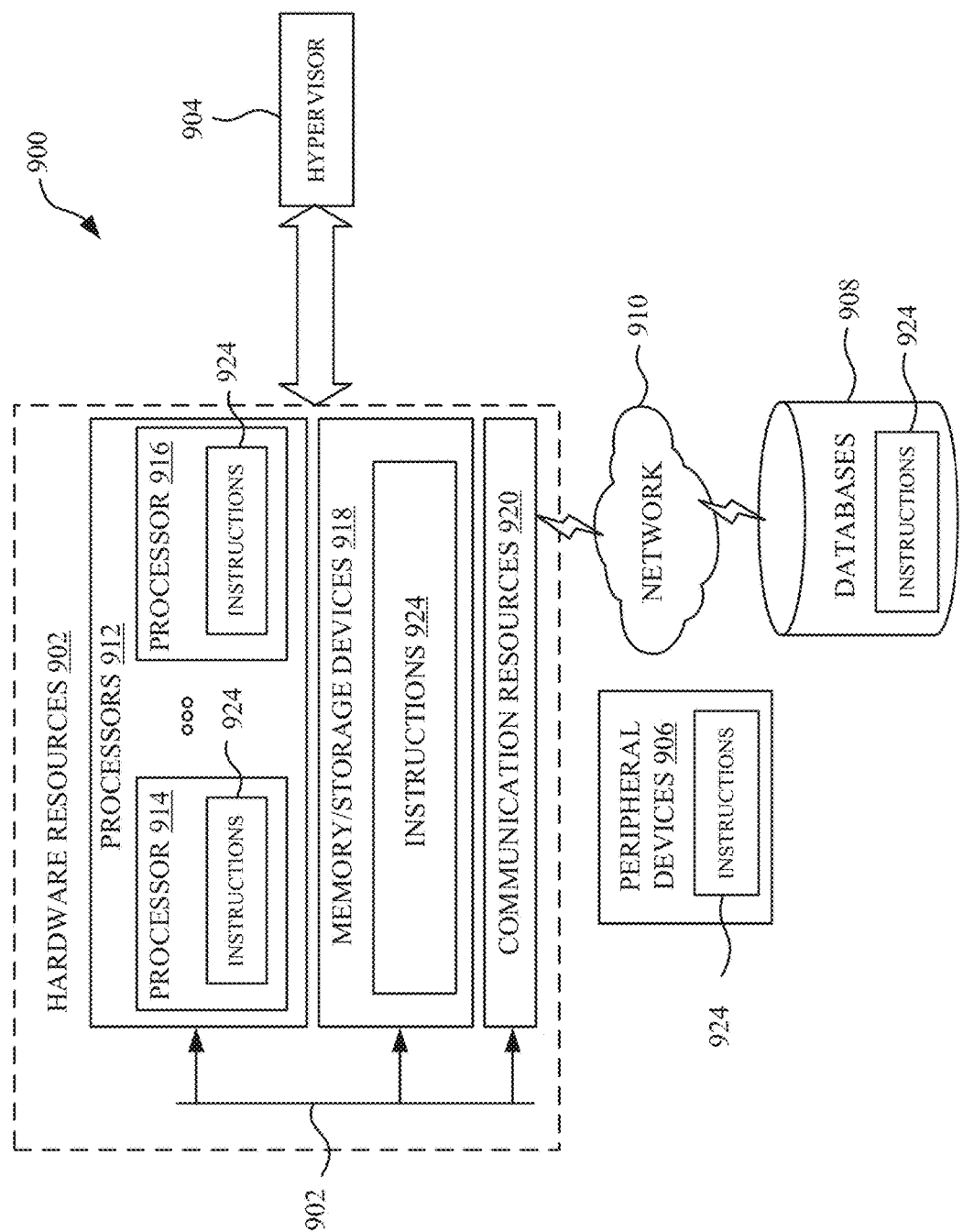
FIG. 9 illustrates components in accordance with some embodiments

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 912 (or processor cores), one or more memory/storage devices 918, and one or more communication resources 920, each of which may be communicatively coupled via a bus 922. For embodiments where node virtualization (e.g., NFV) is utilized, a hypervisor 904 may be executed to provide an execution environment for one or more network slices/sub-slices to utilize the hardware resources 902.

The processors 912 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 914 and a processor 916.

The memory/storage devices 918 may include main memory, disk storage, or any suitable combination thereof. The memory/storage devices 918 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 920 may include interconnection or network interface components or other suitable devices to communicate with one or more peripheral devices 906 or one of more databases 908 via a network 99. For example, the communication resources 920 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 924 may comprise software, a program, an application, an applet, an app, or other executable code for causing at least any of the processors 912 to perform any one or more of the methodologies discussed herein. The instructions 924 may reside, completely or partially, within at least one of the processors 912 (e.g., within the processor's cache memory), the memory/storage devices 918, or any suitable combination thereof. Furthermore, any portion of the instructions 924 may be transferred to the hardware resources 902 from any combination of the peripheral devices 906 or the databases 908. Accordingly, the memory of the processors 912, the memory/storage devices 918, the peripheral devices 906, and the databases 908 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceeding figures may be configured to operate in accordance with one or more of the examples set forth below. For another example, circuitry associated with a UE, base station, network element, etc. as described above in connection with one or more of the preceeding figures may be configured to operate in accordance with one or more of the examples set forth below in the example section.

ADDITIONAL EXAMPLES

The following examples pertain to further embodiments.

Example 1. A method for a user equipment (UE), comprising:
  decoding an information element (IE) MAC-CellGroupConfig;
  determining that a field lch-BasedPrioritization of the IE MAC-CellGroupConfig is not configured;
  determining that a plurality of configured grants (CGs) overlap in time domain, each of the plurality of CGs indicative of uplink resources for allocation to a corresponding one of a plurality of CG physical uplink share channels (CG-PUSCHs);
  causing uplink control information (UCI) to be multiplexed onto a CG-PUSCH; and
  selecting the CG-PUSCH with multiplexed UCI for transmission.

Example 2. The method of Example 1, wherein the selecting comprises:

selecting, from the plurality of CGs, a CG indicative of uplink resources for allocation to the CG-PUSCH with multiplexed UCI; and creating a medium access control (MAC) protocol data unit (PDU) for the CG-PUSCH with multiplexed UCI.

Example 3. The method of Example 2, further comprising:

in accordance with a determination that the CG indicative of uplink resources for allocation to the CG-PUSCH with multiplexed UCI has been selected, not creating a MAC PDU for a different CG-PUSCH than the CG-PUSCH with multiplexed UCI.

Example 4. The method of Example 1, further comprising:

determining that there is logical channel (LCH) data available for one of the plurality of CG-PUSCHs, wherein the causing the UCI to be multiplexed comprises:

causing the UCI to be multiplexed onto the CG-PUSCH for which the LCH data is available.

Example 5. The method of any of Examples 1-4, further comprising:

causing the selected CG-PUSCH with multiplexed UCI to be transmitted.

Example 6. The method of any of Examples 1-4, wherein the IE MAC-CellGroupConfig is derived from a message received from a network, the message selected from a group consisting of an RRCSetup message and an RRCReconfiguration message.

Example 7. The method of any of Examples 1-4, wherein the UCI comprises at least one selected from a group consisting of a hybrid automatic repeat request acknowledgement/non-acknowledgement (HARQ ACK/NACK), channel state information (CSI), a channel quality indicator (CQI), a precoding matrix indicator (PMI), and a rank indication (RI).

Example 8. A method for a user equipment 113E), comprising:

decoding an information element (IE) MAC-CellGroupConfig;

determining that a field lch-BasedPrioritization of the IE MAC-CellGroupConfig is not configured;

determining that a plurality of configured grants (CGs) overlap in time domain; and causing uplink control information (UCI) to be multiplexed onto a physical uplink control channel (PUCCH) and not onto a physical uplink share channel (PUSCH).

Example 9. The method of Example 8, further comprising:

causing the PUCCH with multiplexed UCI to be transmitted.

Example 10. The method of any of Examples 8-9, wherein the IE MAC-CellGroupConfig is derived from a message received from a network, the message selected from a group consisting of an RRCSetup message and an RRCReconfiguration message.

Example 11. The method of any of Examples 8-9, wherein the UCI comprises at least one selected from a group consisting of a scheduling request (SR), a hybrid automatic repeat request acknowledgement/non-acknowledgement (HARQ ACK/NACK), channel state information (CSI), a channel quality indicator (CQI), a precoding matrix indicator (PMI), and a rank indication (RI).

Example 12. An apparatus for a user equipment (UE), the apparatus comprising:

one or more processors configured to perform steps of the method according to any of Examples 1-11.

Example 13. A computer readable medium having computer programs stored thereon which, when executed by one or more processors, cause an apparatus to perform steps of the method according to any of Examples 1-11.

Example 14. An apparatus for a communication device, comprising means for performing steps of the method according to any of Examples 1-11.

Example 15. A computer program product comprising computer programs which, when executed by one or more processors, cause an apparatus to perform steps of the method according to any of Examples 1-11.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible In light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameter/attributes/aspects/etc. of one embodiment can be used in another embodiment. The parameter/attributes/aspects/etc. are merely described in one or more embodiment for clarity, and it is recognized that the parameter/attributes/aspects/etc. can be combined with or substituted for parameter/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method for a user equipment (UE), comprising:

decoding an information element (IE) MAC-CellGroupConfig;

determining that a field Ich-BasedPrioritization of the IE MAC-CellGroupConfig is not configured;

determining that a plurality of configured grants (CGs) overlap in time domain, each of the plurality of CGs indicative of uplink resources for allocation to a corresponding one of a plurality of CG physical uplink share channels (CG-PUSCHs);

causing uplink control information (UCI) to be multiplexed onto a CG-PUSCH; and selecting the CG-PUSCH with multiplexed UCI for transmission over other CG-PUSCHs without the multiplexed UCI that correspond to CGs that overlap in the time domain without the multiplexed UCI, wherein the CG-PUSCH is selected over the other CG-PUSCHs based on the presence of the multiplexed UCI.

2. The method of claim 1, wherein the selecting comprises:
   selecting, from the plurality of CGs, a CG indicative of uplink resources for allocation to the CG-PUSCH with multiplexed UCI; and
   creating a medium access control (MAC) protocol data unit (PDU) for the CG-PUSCH with multiplexed UCI.

3. The method of claim 2, further comprising:
   in accordance with a determination that the CG indicative of uplink resources for allocation to the CG-PUSCH with multiplexed UCI has been selected, not creating a MAC PDU for a different CG-PUSCH than the CG-PUSCH with multiplexed UCI.

4. The method of claim 1, further comprising:
   determining that there is logical channel (LCH) data available for one of the plurality of CG-PUSCHs,
   wherein the causing the UCI to be multiplexed comprises:
   causing the UCI to be multiplexed onto the CG-PUSCH for which the LCH data is available.

5. The method of claim 1, further comprising:
   causing the selected CG-PUSCH with multiplexed UCI to be transmitted.

6. The method of claim 1, wherein the IE MAC-CellGroupConfig is derived from a message received from a network, the message selected from a group consisting of an RRCSetup message and an RRCReconfiguration message.

7. The method of claim 1, wherein the UCI comprises at least one selected from a group consisting of a hybrid automatic repeat request acknowledgement/non-acknowledgement (HARQ ACK/NACK), channel state information (CSI), a channel quality indicator (CQI), a precoding matrix indicator (PMI), and a rank indication (RI).

8. A method for a user equipment (UE), comprising:
   decoding an information element (IE) MAC-CellGroupConfig;
   determining that a field Ich-BasedPrioritization of the IE MAC-CellGroupConfig is not configured;
   determining that a plurality of configured grants (CGs) overlap in time domain; and
   causing uplink control information (UCI) to be multiplexed onto a physical uplink control channel (PUCCH) and not onto a physical uplink share channel (PUSCH) in response to determining that the plurality of CGs overlap in the time domain.

9. The method of claim 8, further comprising:
   causing the PUCCH with multiplexed UCI to be transmitted.

10. The method of claim 8, wherein the IE MAC-CellGroupConfig is derived from a message received from a network, the message selected from a group consisting of an RRCSetup message and an RRCReconfiguration message.

11. The method of claim 8, wherein the UCI comprises at least one selected from a group consisting of a scheduling request (SR), a hybrid automatic repeat request acknowledgement/non-acknowledgement (HARQ ACK/NACK), channel state information (CSI), a channel quality indicator (CQI), a precoding matrix indicator (PMI), and a rank indication (RI).

* * * * *